United States Patent [19]

Simington

[11] Patent Number: 4,539,871
[45] Date of Patent: Sep. 10, 1985

[54] SAW CHAIN SHARPENER
[75] Inventor: Jack F. Simington, Chiloquin, Oreg.
[73] Assignee: Simington Products Co., Chiloquin, Oreg.
[21] Appl. No.: 516,129
[22] Filed: Oct. 18, 1974
[51] Int. Cl.³ .......................... B23D 63/16; B24B 9/00
[52] U.S. Cl. ......................................... 76/42; 51/98.5; 76/25 A
[58] Field of Search ........................... 76/25 A, 37, 42; 51/98.5

[56] References Cited
U.S. PATENT DOCUMENTS

| | | | |
|---|---|---|---|
| 2,589,165 | 3/1952 | Toy et al. | 76/40 |
| 3,071,026 | 1/1963 | De Witt | 76/40 |
| 3,592,085 | 7/1971 | Arneson | 76/25 A |
| 3,616,711 | 11/1971 | Daggett | 76/37 |
| 3,717,051 | 2/1973 | Silvey | 76/37 |
| 3,779,103 | 12/1973 | Silvey | 76/25 A |
| 3,890,857 | 6/1975 | Simington | 76/25 A |
| 4,104,793 | 8/1978 | Simington | 30/139 |

Primary Examiner—Al Lawrence Smith
Attorney, Agent, or Firm—Harvey B. Jacobson

[57] ABSTRACT

An upstanding support is provided and a rotary grinding head is journaled from the upper end of the support for rotation about a vertical axis. A horizontally disposed support arm is pivotally mounted from the support at one end portion for swinging about a vertical axis and the other free end portion of the support arm has a grooved support wheel journaled therefrom for rotation about a horizontal axis extending transversely of the support arm. The grooved support wheel may have a saw chain trained thereover and the grooved support wheel, during oscillation of the support arm, is swingable into registry with diametrically opposite side portions of the rotary grinding head. Also, a chain tooth engaging and positioning member is supported from each of the opposite side portions of the support arm adjacent the grooved support wheel and swingable into and out of an operative position. When one side of the support arm is swung toward registry with one side of the rotary grinding head the positioning member on that side of the support arm is swung to the inoperative position and the positioning member on the opposite side of the support arm is utilized to engage and properly position a chain tooth on the upper periphery of the grooved support wheel for movement of that tooth toward engagement with the rotary grinding head.

13 Claims, 4 Drawing Figures

SAW CHAIN SHARPENER

This application comprises an improvement over my U.S. Pat. Nos. 3,880,018 and 3,890,857.

BACKGROUND OF THE INVENTION

Heretofore chain saw sharpening devices have been provided whereby both the right and left hand teeth of a saw chain may be sharpened. However, in order to sharpen a chain in a manner such that it may cut in a perfectly even manner, precisely the same bevel and depth of bevel must be formed not only on each cutting tooth on one side of the chain, but the same bevel and depth of bevel must be formed on the cutting teeth on the other side of the chain. The chain saw sharpener and automatic chain sharpener disclosed in my above-mentioned copending applications are capable of performing this function and there have been other prior patented chain saw sharpeners which are purported to be capable of also performing this function.

However, these previously designed machines for sharpening saw chains in a manner such that the teeth on opposite sides of the chain will all be sharpened to substantially the same configuration require that the chain to be sharpened be supported on a first support for sharpening the teeth on one side of the chain and then removed for support on a second support for sharpening the teeth on the other side of the chain. This necessary step of transferring the saw chain from one support to a second support in order to sharpen the teeth on both sides of the chain is not only an extra step required in the process of sharpening a saw chain but also raises the opportunity of error in the proper placement of the two chain supports in relation to the rotary grinding head and thus the possibility of the teeth on opposite sides of the chain not being uniformly sharpened unless a proper positioning of the two saw chain supports in relation to the rotary grinding head is checked frequently. Further, the necessity of providing two saw chain supports results in unnecessary duplication of parts and higher cost of manufacture.

Examples of previously patented saw chain sharpening machines including some features which are similar to various components of the instant invention may be found in U.S. Pat. Nos. 2,217,145, 2,318,456, 2,353,956, 2,410,828 and 3,611,839.

BRIEF DESCRIPTION OF THE INVENTION

The saw chain sharpener of the instant invention includes an upright standard from the upper end of which a rotary grinding head is journaled for rotation about the vertical axis. A horizontal support arm has one end portion thereof oscillatably supported from the upper end of the standard for angular displacement about a vertical axis spaced outwardly from the axis of rotation of the rotary grinding head and the other end of the support arm rotatably supports a grooved support wheel for rotation about a horizontal axis extending transversely of the support arm. A saw chain to be sharpened may be trained over the grooved support wheel and the arm is alternately swingable between positions locating the grooved support wheel in registry with opposite side portions of the rotary grinding head or wheel. In this manner, successive teeth on one side of an associated chain may be brought into registry with one side of the rotary grinding head and thereafter the support arm may be swung to place the grooved support wheel into position in registry with the opposite side of the rotary grinding head in order that successive teeth of the saw chain on the second side of the chain may be successively shifted into contact with the rotary grinding head. Also, the support arm includes tooth engaging and positioing structure operative to adjustably establish stationary angularly displaced positions of the saw chain teeth being sharpened relative to the axis of rotation of the grooved support wheel.

The main object of this invention is to provide a saw chain sharpener capable of sharpening all of the teeth on a chain on both sides thereof in exactly the same manner.

Another object of this invention, in accordance with the immediately preceding object, is to provide a saw chain sharpening device which may be readily adjusted for use in conjunction with various types of saw chains.

A still further object of this invention is to provide a saw chain sharpening device of the type including a rotary grinding head and provided with means for trueing the rotary grinding wheel of the grinding head and making necessary adjustments to compensate for material removed from the grinding wheel preparatory to again resuming saw chain sharpening operations.

A further object of this invention is to provide a saw chain sharpening device which may be utilized by persons possessing less than the usual amount of skill required to properly sharpen a saw chain.

Yet another object of this invention is to provide a saw chain sharpener in accordance with the preceding objects and including a single saw chain support structure from which the saw chain to be sharpened need not be removed during the process of sharpening all of the teeth on both sides of the saw chain.

A final object of this invention to be specifically enumerated herein is to provide a saw chain sharpening device in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
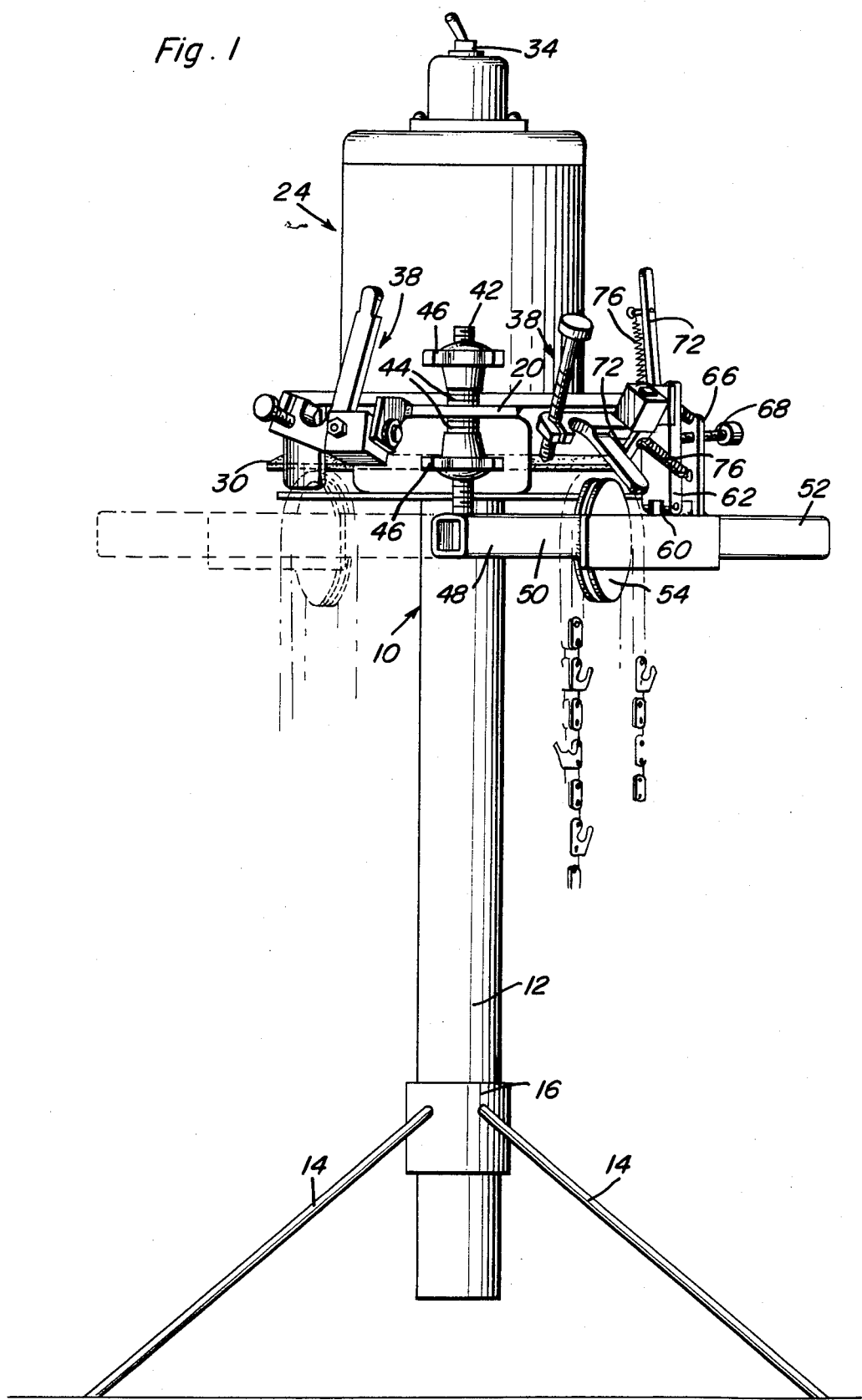
FIG. 1 is a front elevational view of the saw chain sharpening machine of the instant invention illustrating a saw chain to be sharpened supported therefrom.

Referring now more specifically to the drawings, the numeral 10 generally designates the saw chain sharpener of the instant invention. The sharpener 10 includes an upstanding support or standard 12 including lower end support legs 14 adjustably mounted on the lower end of the standard 12 by means of a mounting sleeve 16 slidable on the standard 12 and secured in adjusted positions thereon by means of setscrews 18.

The upper end of the standard 12 includes a horizontally outwardly directed mounting arm 20 whose outer end portion is longitudinally slotted as at 22 and from whose mid-portion a rotary grinding head assembly referred to in general by the reference numeral 24 is rigidly supported. The rotary grinding head assembly 24 includes a vertically disposed electric motor 26 having a depending rotary output shaft 28 upon which a rotary grinding disk 30 is mounted. The shaft 28 projects through an opening (not shown) provided therefor in the mounting arm 20 and the rotary grinding head 24 includes shield structure 32 for enclosing considerable portions of the grinding disk 28. The motor 26 includes a control switch 34 of the three position type, the motor 26 being of the reversible type, and a lamp structure referred to in general by the reference numeral 36 is electrically connected to the switch 34 for electrical actuation thereby whenever the motor 26 is electrically actuated for rotation in either direction.

The guard structure 32 includes a pair of disk dressing assemblies referred to in general by the reference numerals 38 and 40 for beveling and trueing the outer periphery of the grinding disk 30. The assemblies 38 include more or less conventional structure for movement into and out of operative positions for dressing the grinding disk 30.

A vertical threaded support shank 42 extends downwardly through the slot 22 and is slidable therealong. A plurality of washers 44 are disposed on the shank 42 both above and below the slotted end of the mounting arm 20 and upper and lower hand nuts 46 are threaded on the support shank 42 above and below the upper and lower sets of washers 44. The lower end of the support shank 42 is spaced below the lower hand nut 46 and is rigidly anchored to a first end 48 of a support arm 50. The second end 52 of the support arm 50 defines a handle portion and a centrally grooved support wheel 54 is journaled from an intermediate portion of the support arm 50 by means of a horizontal axle pin 56 disposed at substantially right angles to the longitudinal centerline of the support arm 50. The support wheel 54 may have a saw chain 58 trained thereover for steady support of the chain 58 from the support arm 50 in a manner such that the chain may be adjustably longitudinally advanced to bring successive teeth of the chain into registry with the upper periphery of the support wheel 54.

The support arm 50 includes an upstanding mounting lug 60 thereon between the second end 52 and the support wheel 54 adjacent the latter and the lower bifurcated end of an upstanding arm 62 is oscillatably supported from the mounting lug 60 as at 64. Further, the outer or second end portion 52 of the arm 50 also includes an upstanding support 66 spaced outwardly of the lug 60 and through whose upper portion an adjustment screw 68 is threaded. The adjustment screw 68 is horizontally disposed and extends longitudinally of the support arm 50. One end of the adjusting screw 68 abuts the side of the upper end portion of the support arm 62 remote from the support wheel 54 and an expansion spring 70 is secured between the upper end of the support arm 62 and the upper end of the support or upright 66 and yieldingly biases the upper end portion of the support arm 62 toward engagement with the adjusting screw 68.

A pair of side-by-side elongated abutment or stop members 72 are oscillatably supported between the furcations of the upper end of the support arm 62 as at 74 and a pair of expansion springs 76 are connected between the free end portions of the abutment members 72 and corresponding lower opposite side portions of the support arm 62. Further, the upper end of the standard 12 includes a horizontal transverse support 78 whose opposite ends include upwardly directed canted flanges 80 through which stop screws 82 are threaded, the stop screws 82 being horizontally disposed and engageable by the free end portion of the support arm 50 on opposite sides of the standard 12 to limit swinging movement of the central portion of the support arm 50 from which the support wheel 54 is journaled toward the outer periphery of the disk 30.

Figure 2:
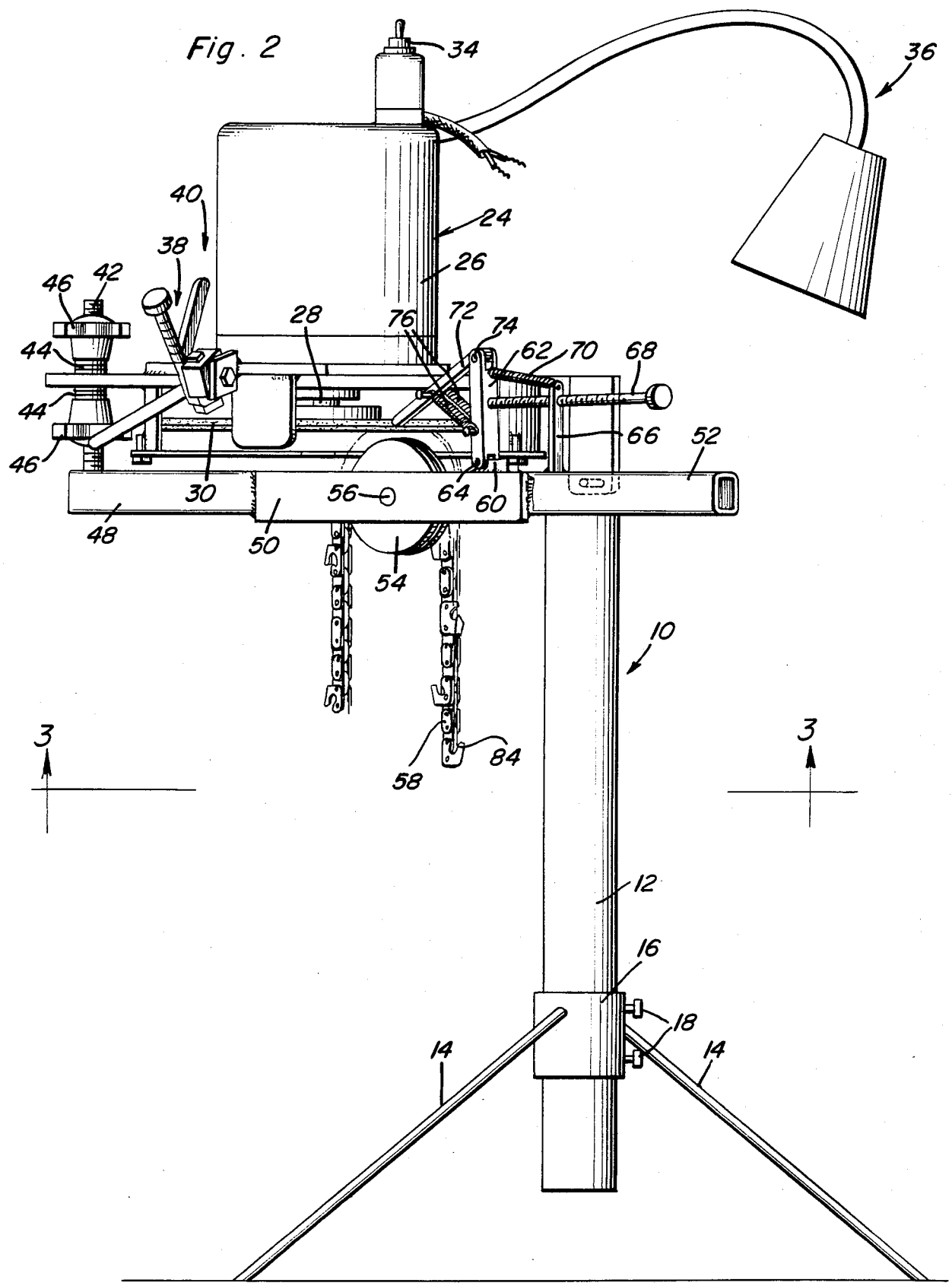
FIG. 2 is a side elevational view of the assemblage illustrated in FIG. 1 as seen from the right side thereof.
Figure 3:
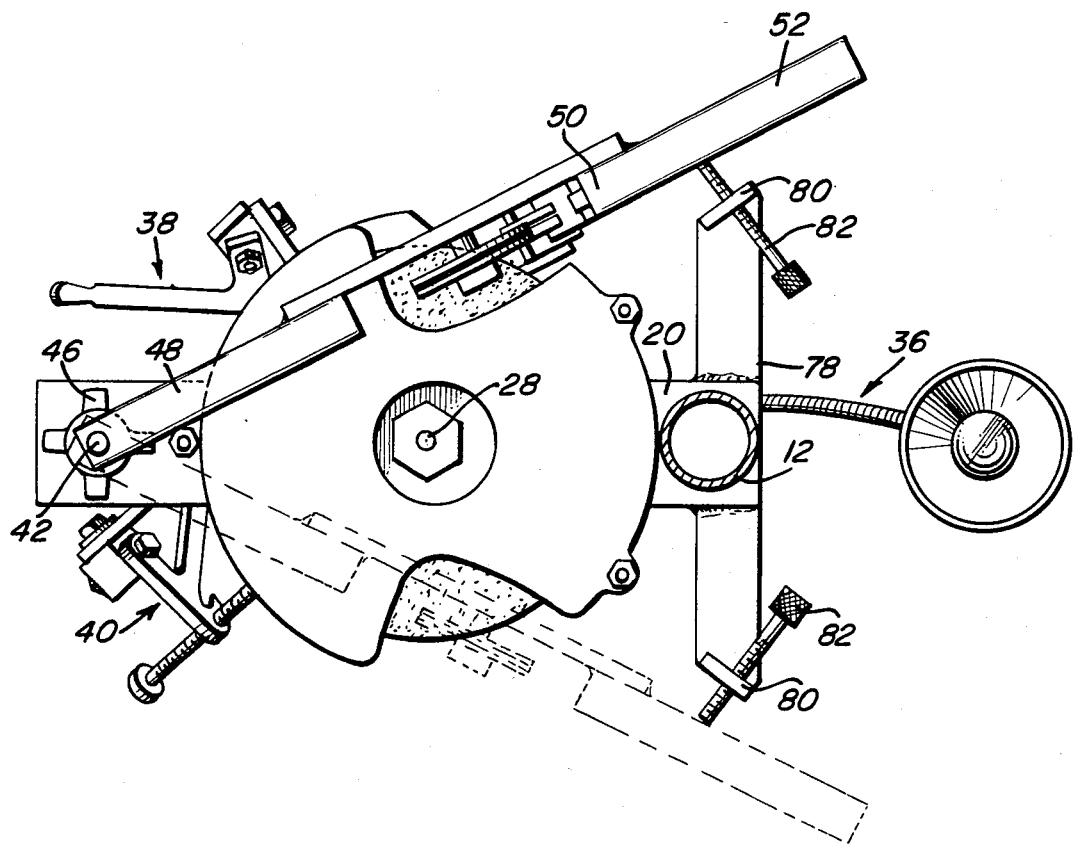
FIG. 3 is a horizontal sectional view taken substantially upon the plane indicated by the section line 3—3 of FIG. 2.
Figure 4:
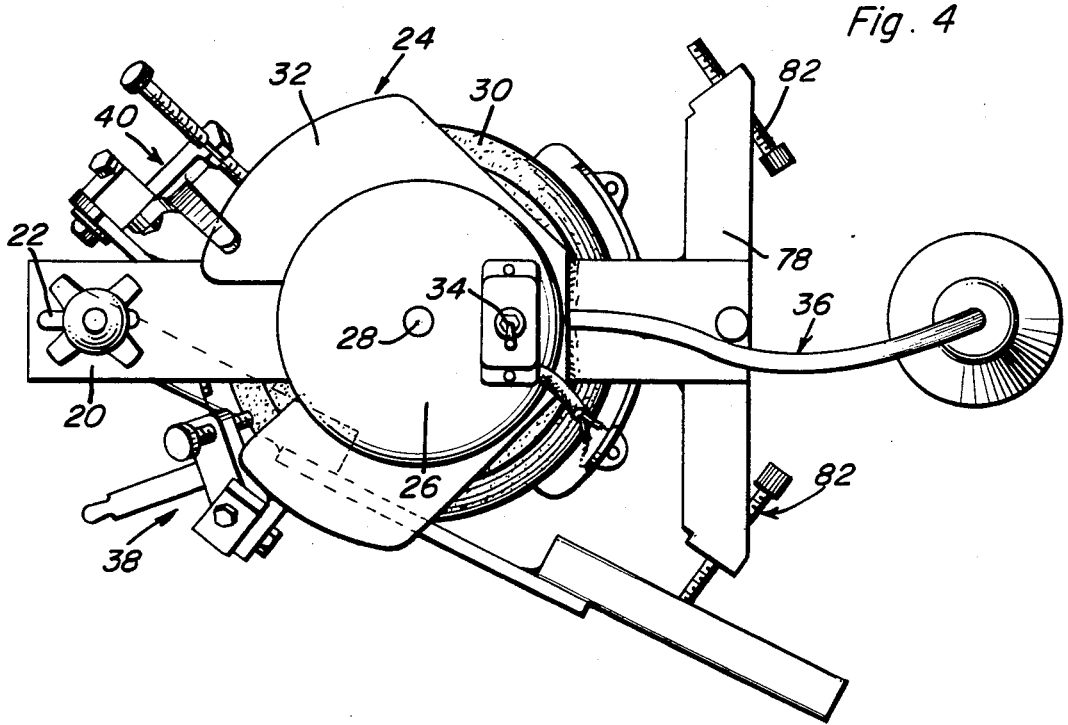
FIG. 4 is a top plan view of the saw chain sharpener.

In operation, a saw chain 58 to be sharpened is trained over the support wheel 54 as shown in FIG. 2. The elongated abutment member or link 72 adjacent the mounting arm 20 has its free end swung upwardly and over the support arm 62 toward the free second end 52 of the support arm 50 in order to shift that abutment member 72 to an out-of-the-way position. Then, a selected tooth on the side of the chain 58 remote from the grinding disk 30 may be advanced into sharpening position by advancing the chain 58 in a counterclockwise direction over the support wheel 54 until that saw tooth passes beneath the abutment member 72 retained in the operative position. Then, the chain is slightly reversed in direction until the lower free end of the abutment member 72 abuts the selected tooth and prevents further clockwise movement of the chain 58 while a downward manual pressure is applied thereto as at 84. Then, the adjusting screw 68 is adjusted in conjunction with adjustment of the adjacent adjusting screw 82 in order to properly position the selected cutting tooth for engagement with the outer periphery of the disk 30. After proper positioning of the first cutting tooth has been obtained, the arm 50 is swung away from the grinding wheel or disk 30 and the switch 34 is actuated to electrically actuate the motor 26 in order to rotate the disk 30 in the proper direction. Then, the support arm 50 may be moved toward the disk 30 in order to bring the tooth to be sharpened into contact with the rotating disk. If further sharpening is desired, the adjustment screw 82 may be slightly backed off.

After each tooth is sharpened, the support arm 50 is swung slightly away from the disk 30 and the chain 58 is again advanced in a counterclockwise direction and thereafter slightly in a clockwise direction so as to position the next tooth on the outer side of the chain in proper position for sharpening. Then, with downward pressure again being applied to the chain 58 as at 84 the arm 50 is swung back toward the disk 30 whereupon the next tooth to be sharpened is brought into contact with the disk 30.

After all of the teeth on one side of the chain are sharpened, the support arm 50 is swung to the other side of the disk 30 and the teeth on the other side of the chain may be sharpened in substantially the same manner.

According to the type of tooth to be sharpened, the positioning of the support shank 42 along the slot 22 may be adjusted as desired. Further, elevation of the support shank 42 relative to the mounting arm 20 may also be adjusted as desired.

If but a few types of chain saw chains are to be sharpened by the machine 10, the machine 10 may be provided with a free end on the mounting arm 20 corresponding to the slotted end thereof which is disposed lower in elevation and generally at the level of the lower hand nut 46 in FIG. 2. If such a modification is made, the base end of the support arm 50 may be directly supported from such a lower mount without benefit of the vertically adjustable support shank and the equivalent of the slot 22. By this construction, a more rigid pivotal mounting of the support arm 50 will be provided.

The abutment or stop members 72, by their angular relationship with the saw chain teeth engaged thereby define locks to prevent angular displacement of the chain 58 about the axle pin 56 to advance the chain 58 in a direction toward the adjusting screw 68. Further, the springs 76 coact with the stop members 72 to also lock the chain 58 and thus the associated tooth against angular displacement in the opposite direction. Accordingly, each chain tooth to be sharpened is positioned in exactly the same position relative to the grinding disk 30.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

I claim:

1. A chain saw sharpener, said sharpener including a rotary grinding member, a support arm, means oscillatably mounting one end portion of said support arm for angular displacement about an axis generally paralleling and spaced from the axis of rotation of said grinding member, said support arm, at a location spaced therealong from said one end portion thereof, including support means for supporting a saw chain for guided shifting of at least a short lengthwise extending section thereof longitudinally of said support arm, positioning means supported from said support arm and engageable with said section of said chain to limit shifting of said section in at least one direction, the spacing between the axis of rotation of said grinding member and the axis of oscillation of said arm and the spacing of said support means along said support arm from the axis of oscillation of the latter being such so as to position said support means generally on radii of the axis of rotation of said rotary grinding member when said support arm is swung into positions closely adjacent opposite side portions of the periphery of said grinding member.

2. The combination of claim 1 wherein said support means comprises a grooved wheel supported from said support arm with its center axis disposed transverse to said support arm and generally paralleling the plane through which said support arm is swingable.

3. The combination of claim 2 wherein said wheel is journaled from said support arm.

4. The combination of claim 1 wherein said positioning means includes swing arm means pivotally supported from said support arm for shifting between operative and inoperative positions and adapted to engage a tooth of said chain section to prevent movement of said tooth in said one direction.

5. The combination of claim 4 wherein said swing arm means includes a pair of swing arms supported in inclined positions, when in said operative positions, with their free swinging ends lowermost and the upper ends of said swing arms spaced above the elevation of said support means, said lowermost ends of said swing arms closely overlying said support means and disposed in side-by-side relation on opposite sides of a plane generally paralleling said support arm and the axis of oscillation of said support arm.

6. The combination of claim 5 including means yieldingly biasing said swing arms toward said operative positions.

7. The combination of claim 5 including a mount shiftably supported from said support arm and including a portion thereof elevated above the level of said support means and shiftable lengthwise of said support arm, positioning means operatively connected between said mount and said support arm for adjustably positioning said support relative to said support arm, the upper ends of said swing arms being pivotally supported from said portion of said mount.

8. A chain saw sharpener, said sharpener including a rotary grinding member, support means for supporting a length of saw chain, means guidingly supporting said support means for oscillation, relative to the axis of rotation of said rotary grinding member, along a path of movement of predetermined extent, said path including opposite end portions directed at their terminal ends, inwardly toward the axis of rotation of said grinding member from positions along said path spaced outwardly of corresponding opposite side portions of the grinding member.

9. The combination of claim 8 wherein said path of movement is arcuate throughout its entire length and said grinding member is disposed between the ends of said path movement.

10. The combination of claim 8 including means operative to adjustably lengthen and shorten the opposite ends of said path of movement.

11. The combination of claim 8 wherein said support means includes means for supporting a length of saw chain for lengthwise shifting of the latter along a path disposed at generally right angles relative to the corresponding axis of rotation of said grinding member.

12. The combination of claim 11 including lock means carried by said means guidingly supporting said support means and shiftable between operative and inoperative position, said lock means, when in said operative position, being positioned relative to said support means for engagement with the tooth of a saw chain supported on said support means to prevent lengthwise shifting of said chain in one lengthwise direction relative to said support means.

13. A saw chain sharpener, said sharpener including:
a rotary grinding member,
a support arm,
means oscillatably mounting one end portion of said support arm for angular displacement about an axis generally paralleling the axis of rotation of said grinding member,
said support arm, at a location spaced therealong from said one end portion thereof, including support means for supporting a saw chain for guided shifting of at least a short lengthwise extending section thereof longitudinally of said support arm,
the spacing of said support means along said support arm from the axis of oscillation of the latter being such so as to position said support means generally on radii of the axis of rotation of said rotary grinding member when said support arm is swung into positions closely adjacent opposite side portions of the periphery of said grinding member.

* * * * *